(12) United States Patent　　　　　(10) Patent No.:　US 12,663,591 B2

Sakaguchi et al.　　　　　　　　　　　(45) Date of Patent:　　Jun. 23, 2026

(54) OPTICAL CONNECTOR CLEANING TOOL

(71) Applicant: Fujikura Ltd., Tokyo (JP)

(72) Inventors: Yuya Sakaguchi, Chiba (JP); Shunsuke Fujita, Chiba (JP)

(73) Assignee: Fujikura Ltd., Tokyo (JP)

( * ) Notice:　Subject to any disclaimer, the term of this patent is extended or adjusted under 35 U.S.C. 154(b) by 316 days.

(21) Appl. No.:　18/285,161

(22) PCT Filed:　Feb. 10, 2022

(86) PCT No.:　PCT/JP2022/005384

§ 371 (c)(1),
(2) Date:　Sep. 29, 2023

(87) PCT Pub. No.: WO2022/269991

PCT Pub. Date: Dec. 29, 2022

(65)　　　　　Prior Publication Data

US 2024/0184059 A1　　Jun. 6, 2024

(30)　　　Foreign Application Priority Data

Jun. 23, 2021　(JP) ................................. 2021-104165

(51) Int. Cl.
*G02B 6/38*　　　　(2006.01)
*B08B 1/34*　　　　(2024.01)
(52) U.S. Cl.
CPC .............. *G02B 6/3866* (2013.01); *B08B 1/34* (2024.01); *B08B 2240/02* (2013.01)
(58) Field of Classification Search
CPC ...... G02B 6/3866; B08B 1/34; B08B 2240/02
See application file for complete search history.

(56)　　　　　　References Cited

U.S. PATENT DOCUMENTS 9,821,347 B2 * 11/2017 Nakane ................ B65H 37/007
9,958,619 B2 * 5/2018 Kamouchi ........... G02B 6/3866
(Continued)

FOREIGN PATENT DOCUMENTS

CN　　　1806943 A　　7/2006
CN　　105122108 A　　12/2015
(Continued)

OTHER PUBLICATIONS

International Search Report issued in corresponding International Application No. PCT/JP2022/005384 mailed Mar. 29, 2022 (6 pages).

*Primary Examiner* — Daniel Petkovsek

(74) *Attorney, Agent, or Firm* — Osha Bergman Watanabe & Burton LLP

(57)　　　　　　ABSTRACT

An optical connector cleaning tool includes a supplier that supplies a cleaning element having a belt shape, a cleaning shaft including a head having a pressing surface that presses the cleaning element supplied from the supplier against a connection end surface of an optical connector and a supporter supporting the head part, a collector that collects the cleaning element from the pressing surface, and a tubular member having an inner hole accommodating the cleaning shaft such that the head protrudes from the inner hole. The cleaning element collected from the pressing surface to the collector passes between an inner surface of the inner hole and a first facing portion of the head facing the inner surface. The first facing portion includes a first region in which the cleaning element is interposed between the inner surface and the first facing portion and a second region adjacent to the first region.

3 Claims, 12 Drawing Sheets

(56) References Cited

U.S. PATENT DOCUMENTS

| | | | | |
|---|---|---|---|---|
| 11,644,626 B2 * | 5/2023 | Castro | ....................... | B08B 1/30 |
| | | | | 15/210.1 |
| 2003/0098045 A1 | 5/2003 | Loder et al. | | |
| 2005/0286853 A1 * | 12/2005 | Fujiwara | ................ | B08B 1/143 |
| | | | | 385/134 |
| 2006/0191091 A1 | 8/2006 | Kida | | |
| 2014/0259480 A1 | 9/2014 | Kida | | |
| 2016/0041345 A1 | 2/2016 | Kamouchi et al. | | |
| 2017/0059788 A1 | 3/2017 | Nakane | | |
| 2018/0088285 A1 * | 3/2018 | Braun | ....................... | B08B 1/40 |

FOREIGN PATENT DOCUMENTS

| | | | |
|---|---|---|---|
| JP | 2005-181971 A | 7/2005 |
| JP | 2007-003901 A | 1/2007 |
| JP | 2014-035489 A | 2/2014 |
| JP | 2014-035490 A | 2/2014 |
| JP | 2014-035491 A | 2/2014 |
| JP | 2014-206733 A | 10/2014 |
| WO | 2014/141405 A1 | 9/2014 |

* cited by examiner

100

OPTICAL CONNECTOR CLEANING TOOL

CROSS-REFERENCE TO RELATED APPLICATIONS

The present application claims priority to Japanese Patent Application No. 2021-104165, filed Jun. 23, 2021. The contents of this application are incorporated herein by reference in their entirety.

BACKGROUND

Technical Field

The present invention relates to an optical connector cleaning tool that cleans a connection end surface of an optical connector.

Description of the Related Art

As an optical connector cleaning tool that cleans a connection end surface of an optical connector with a cleaning tape, the one in which the cleaning tape is supplies from a supply reel to a front end of a cleaning shaft and the cleaning tape is collected from the cleaning shaft to a winding reel in accordance with the forward and backward movement of the cleaning shaft is known (refer to, for example, Patent Document 1).

The cleaning shaft of the optical connector cleaning tool includes a tape support shaft having a front end sliding surface for bringing the cleaning tape into contact with the connection end surface, and a cylindrical guide pipe supporting the tape support shaft. A tape forward path through which the cleaning tape moves toward the front end of the tape support shaft is formed on the upper surface of the tape support shaft, and a tape backward path through which the cleaning tape moves toward the rear end is also formed on the lower surface of the tape support shaft. Tape forward and backward paths through which the cleaning tape moves are also formed inside the guide pipe. An insertion shaft of the tape support shaft is inserted into the guide pipe, and the tape forward path of the tape support shaft and the tape forward path of the guide pipe are connected, and the tape backward path of the tape support shaft and the tape backward path of the guide pipe are connected.

PATENT DOCUMENT

PATENT DOCUMENT 1: JP 2014-206733 A

In the optical connector cleaning tool described above, when the cleaning tape is collected around the winding reel, the tape support shaft may be bent upward (toward the collection side) by pulling the tape support shaft by the moving cleaning tape. As a result, the cleaning tape may be stuck between the tape support shaft and the guide pipe, and it may be difficult to collect the cleaning tape.

SUMMARY

One or more embodiments provide an optical connector cleaning tool capable of smoothly collect a cleaning element.

An optical connector cleaning tool according to one or more embodiments is an optical connector cleaning tool configured to clean a connection end surface of an optical connector, the optical connector cleaning tool comprising: a supply unit (example of a supplier) that supplies a cleaning element having a belt shape; a cleaning shaft including: a head part (example of a head) having a pressing surface configured to press the cleaning element supplied from the supply unit against the connection end surface; and a support part (example of a supporter) supporting the head part; a collection unit (example of a collection) that collects the cleaning element from the pressing surface; and a tubular member having an inner hole accommodating the cleaning shaft so that the head part protrudes from the inner hole, wherein the cleaning element collected from the pressing surface to the collection unit passes between an inner surface of the inner hole and a first facing portion of the head part facing the inner surface, the first facing portion includes: a first region in which the cleaning element is interposed between the inner surface and the first facing portion; and a second region adjacent to the first region, and a first gap between the inner surface and the first region is wider than a second gap between the inner surface and the second region.

In one or more embodiments, a portion of the inner surface facing the first facing portion may have an arc cross-sectional shape recessed outward.

In one or more embodiments, a portion of the inner surface facing the first facing portion may have a stepped cross-sectional shape recessed outward.

In one or more embodiments, the cleaning element supplied from the supply unit to the pressing surface may pass between the inner surface of the inner hole and a second facing portion of the head part facing the inner surface, the second facing portion may include: a third region in which the cleaning element is interposed between the inner surface and the second facing portion; and a fourth region adjacent to the third region, and a third gap between the inner surface and the third region may be wider than a fourth gap between the inner surface and the fourth region.

In one or more embodiments, the supply unit may include a feeding bobbin that feeds the cleaning element before use, the collection unit may include a winding bobbin that winds the cleaning element after use, and the optical connector cleaning tool may comprise: a tool main body housing the feeding bobbin and the winding bobbin, and a driving mechanism (example of a driver) that rotates the winding bobbin in accordance with the relative movement of the cleaning shaft with respect to the tool main body to wind the cleaning element around the winding bobbin.

According to one or more embodiments, because the first gap between the inner surface of the inner hole of the tubular member and the first region of the head part is wider than the second gap between the inner surface and the second region, it is possible to smoothly collect the cleaning element.

DESCRIPTION OF THE EMBODIMENTS

Hereinafter, embodiments will be described with reference to the drawings.

Figure 1:
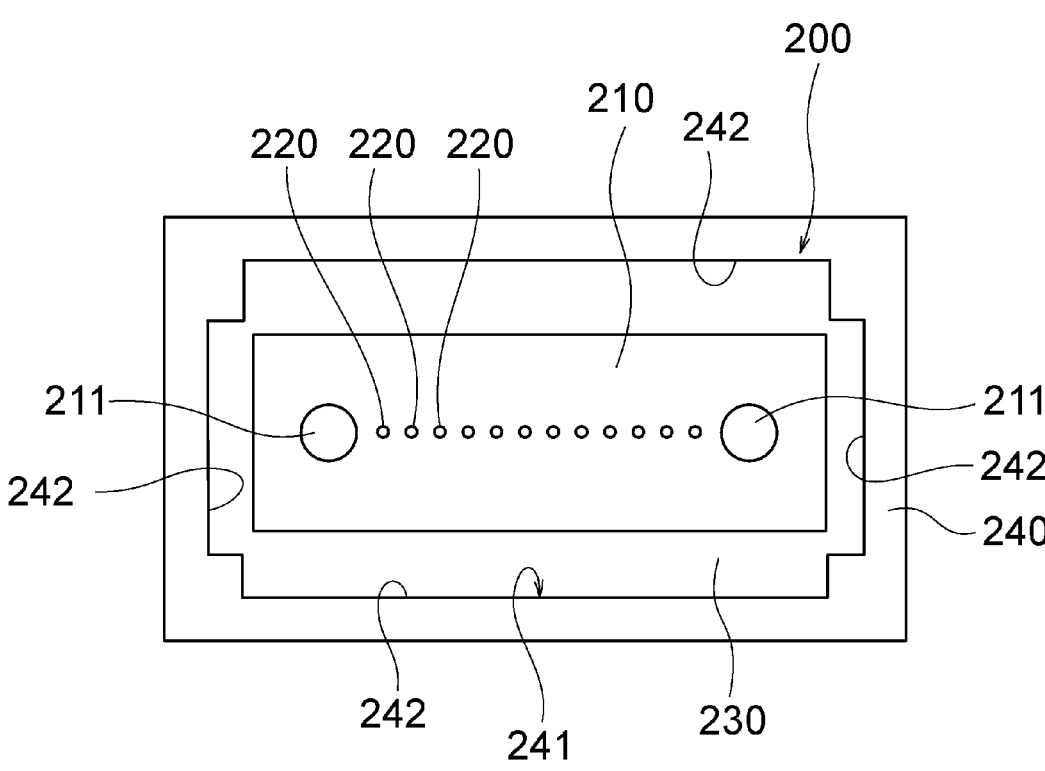
FIG. 1 is a front view showing the optical connector as a cleaning object of the optical connector cleaning tool in one or more embodiments.

The optical connector cleaning tool 1 in one or more embodiments is a cleaner that cleans a connection end surface of an optical connector that connects optical fibers. FIG. 1 is a front view showing the optical connector 200 as a cleaning object of the optical connector cleaning tool 1 in one or more embodiments.

The optical connector 200 that is a cleaning object of the optical connector cleaning tool 1 is, for example, a multi-fiber collective connection type optical connector plug that simultaneously connects multiple optical fibers.

Specifically, as shown in FIG. 1, the optical connector 200 includes a ferrule 210 having a flat (rectangular) cross-sectional shape (end surface shape). The ferrule 210 is a so-called MT (Mechanical Transferable) ferrule and has multiple (e.g., 12 (twelve)) fiber holding holes arranged along the cross-sectional longitudinal direction of the ferrule 210. The optical fiber 220 is inserted into each of the fiber holding holes, and the optical fiber 220 is fixed to the ferrule 210 by an adhesive. The optical fibers 220 are exposed from the end surfaces of the ferrule 210. The ferrule 210 is held in the housing 230.

The number of the optical fibers 220 held in the ferrule 210 is not particularly limited and may be, for example, more than 12. The optical fibers 220 may be arranged in multiple rows (for example, two (2) rows) along the cross-sectional longitudinal direction of the ferrule 210. As the ferrule 210 described above, an MT ferrule specified in JIS C 5981 or JIS C 5982 may be used.

When the pair of optical connectors 200 having the ferrules 210 are connected, the pair of optical connectors 200 are inserted into the insertion ports 241 on both sides of the sleeve-shaped adapter 240. The insertion port 241 includes four grooves 242. The optical fibers 220 exposed from the end surfaces of the ferrules 210 are optically connected to each other by abutting the end surfaces of the ferrules 210 of the pair of optical connectors 200. At this time, the optical connectors 200 are positioned with high accuracy by inserting the guide pins 211 of the one ferrule 210 into the guide holes (not shown) of the other ferrule 210.

If a contaminant such as dirt, dust, and oil is adhered to the end surface of the ferrule 210 at the time of abutting, it may cause damage at the time of attaching and detaching, an increase in transmission loss, and the like. Therefore, the end surface of the ferrule 210 is cleaned using the optical connector cleaning tool 1 described below before the optical connectors 200 are connected. At the time of this cleaning, the optical connector 200 to be cleaned is inserted into one insertion port 241 of the adapter 240, and the end surface of the ferrule 210 of the optical connector 200 is cleaned by inserting the optical connector cleaning tool 1 into the other insertion port 241 of the adapter 240.

Although the optical connector 200 described above is an optical connector plug used in the plug-adapter-plug coupling system, the end surface of the ferrule of the optical connector receptacle used in the plug-receptacle coupling system may be cleaned using the optical connector cleaning tool 1 described below. Specifically, the optical connector receptacle includes a ferrule attached to the tips of the optical fibers and incorporated into a housing into which the optical connector plug is inserted.

Alternatively, a cap having an inner hole having the same shape as the inner hole of the adapter may be attached to the front end of the optical connector cleaning tool 1, and the optical connector plug may be inserted into the cap to clean the connection end surface of the optical connector plug alone in a state where the optical connector plug is not inserted into the adapter.

Hereinafter, the configuration of the optical connector cleaning tool 1 in one or more embodiments will be described in detail with reference to the drawings. The optical connector cleaning tool 1 described below has basically the same configuration as the optical connector cleaning tool disclosed in JP 2014-35489 A, JP 2014-35490 A and JP 2014-35491 A except for the configuration of the front end portion of the extension member 100.

Figure 2:
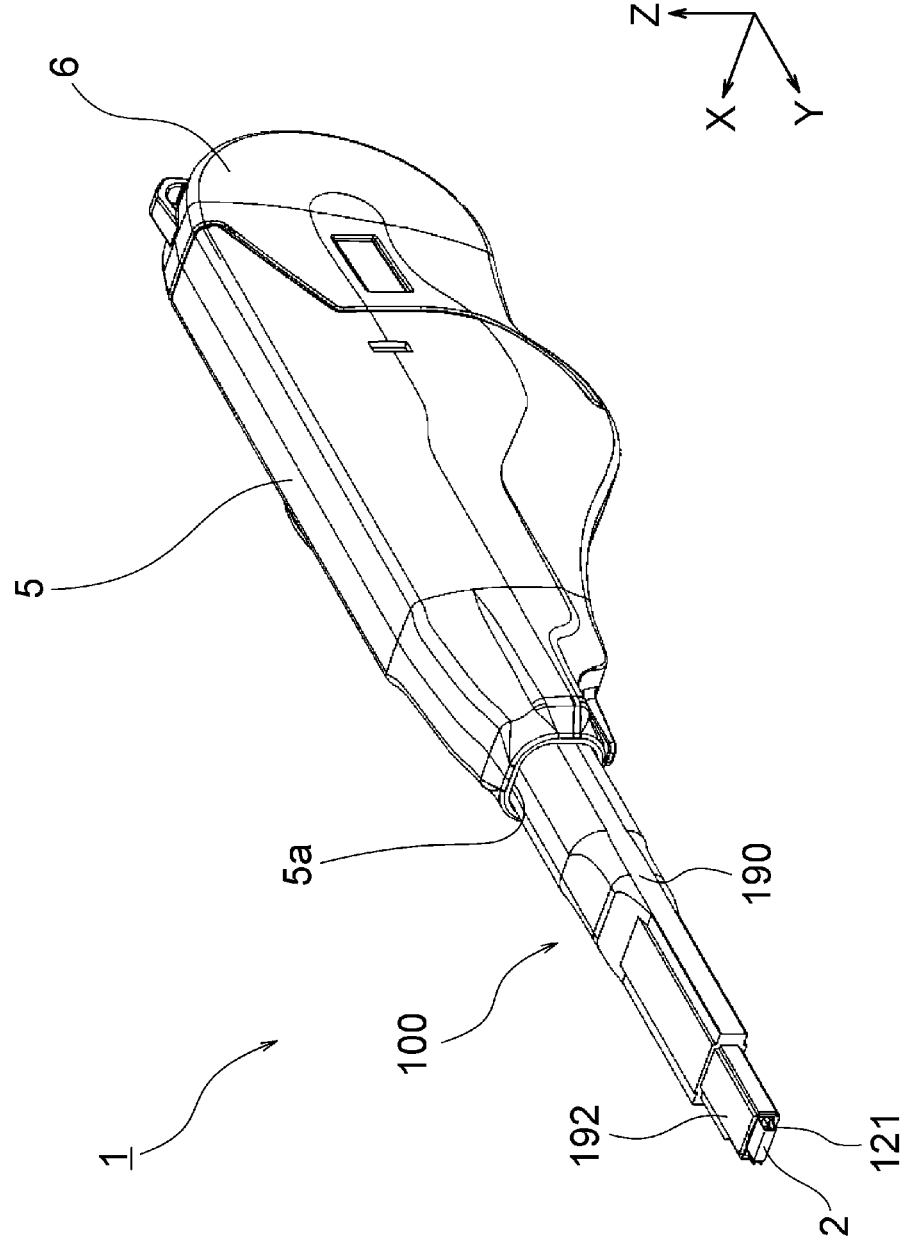
FIG. 2 is a perspective view showing the optical connector cleaning tool in one or more embodiments.

First, the overall configuration of the optical connector cleaning tool 1 in one or more embodiments will be described with reference to FIG. 2 and FIG. 3. FIG. 2 is a perspective view showing the optical connector cleaning tool 1 in one or more embodiments, and FIG. 3 is a perspective view showing the optical connector cleaning tool 1 in a state where the covers 5 and 6 are removed in one or more embodiments.

Figure 3:
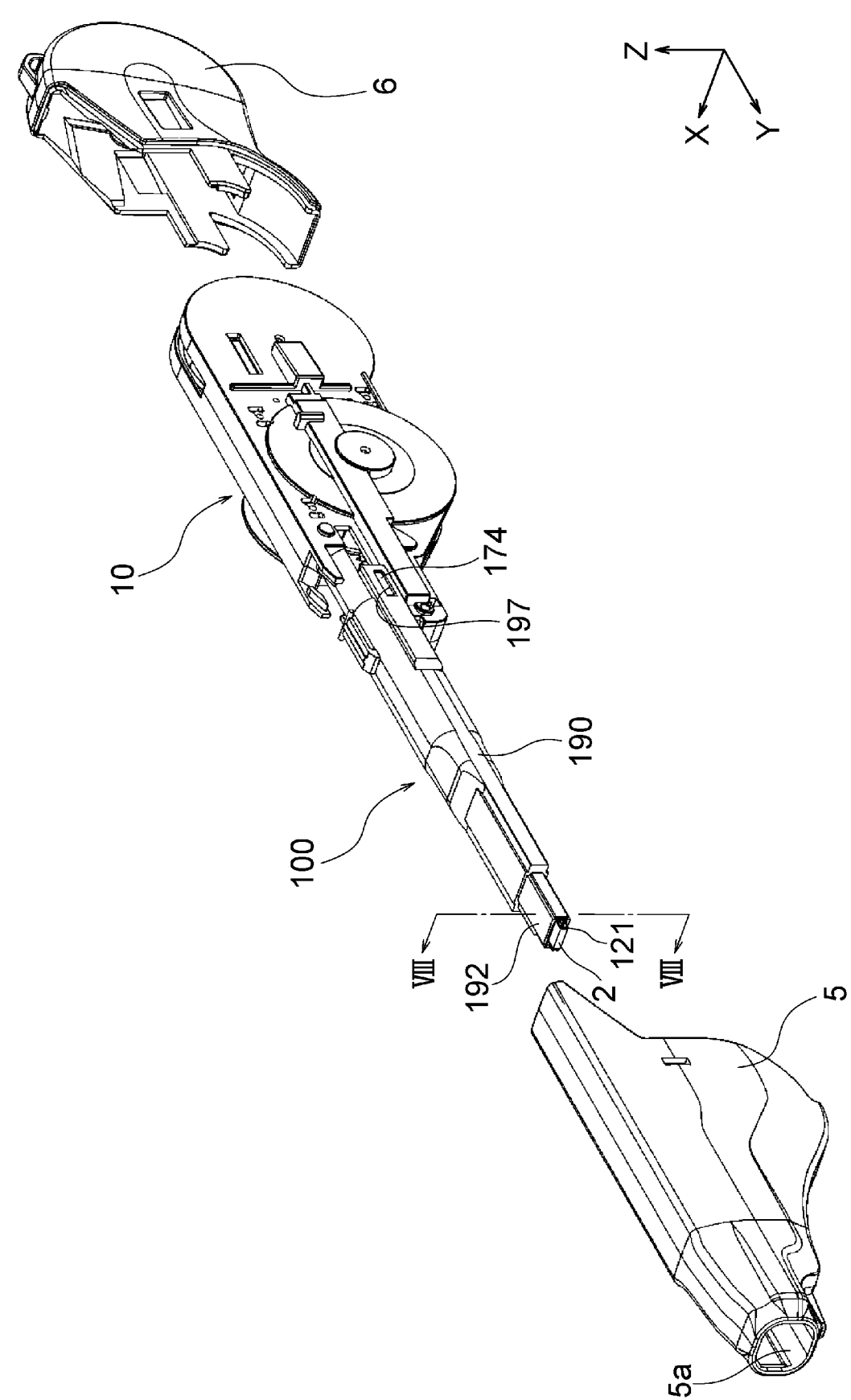
FIG. 3 is a perspective view showing the optical connector cleaning tool in a state where the covers are removed in one or more embodiments.

As shown in FIG. 2 and FIG. 3, the optical connector cleaning tool 1 (hereinafter, also simply referred to as "cleaning tool 1") in one or more embodiments includes a tool main body 10 and an extension member 100 extending from the tool main body 10. The tool main body 10 is covered with the front cover 5 and the rear cover 6. The extension member 100 protrudes forward (the +Y direction in the drawing) from the opening 5a of the front cover 5.

The extension member 100 has the pressing surface 121 (described later) that presses the cleaning element 2 against the connection end surface (the end surface of the ferrule 210 described above) of the optical connector 200 at the front end. The tool main body 10 includes the bobbins 30 and 40 (described later) for continuously supplying and collecting the cleaning element 2 to and from the pressing surface 121. The extension member 100 can move relative to the tool main body 10 along the axial direction of the extension member 100 (the Y-axis direction in the drawing).

Since the cleaning element 2 moves on the pressing surface 121 in accordance with the relative movement between the tool main body 10 and the extension member 100 (the forward movement of the tool main body 10 with respect to the extension member 100) and the cleaning element 2 slides while being pressed against the connection end surface of the optical connector 200, it is possible to efficiently wipe off the contaminant adhering to the end surface. However, when the sticky cleaning element is applied, it may be configured to only press the cleaning element against the connection end surface without sliding the cleaning element. Further, it is possible to collect the used cleaning element 2 from the pressing surface 121 to the winding bobbin 40 and supply the unused cleaning element 2 from the feeding bobbin 30 to the pressing surface 121 in accordance with the relative movement (the backward movement of the tool main body 10 with respect to the extension member 100).

As described above, the optical connector 200 to be cleaned in one or more embodiments is a multi-fiber collective connection type optical connector, and the end surface of the ferrule 210 of the optical connector 200 has a flat shape. Therefore, the cleaning element 2 is an elongate belt-shaped continuous body (tape). The width of the cleaning element 2 is large enough to wipe the end surfaces of all the optical fibers 220 exposed on the end surface of the ferrule 210 and the periphery thereof (for example, the region between the guide pins 211) at once. Although not particularly limited, as an example of such a tape-shaped cleaning element 2, a woven fabric made of ultrafine fibers made of polyester, nylon, or the like can be exemplified.

Figure 4:
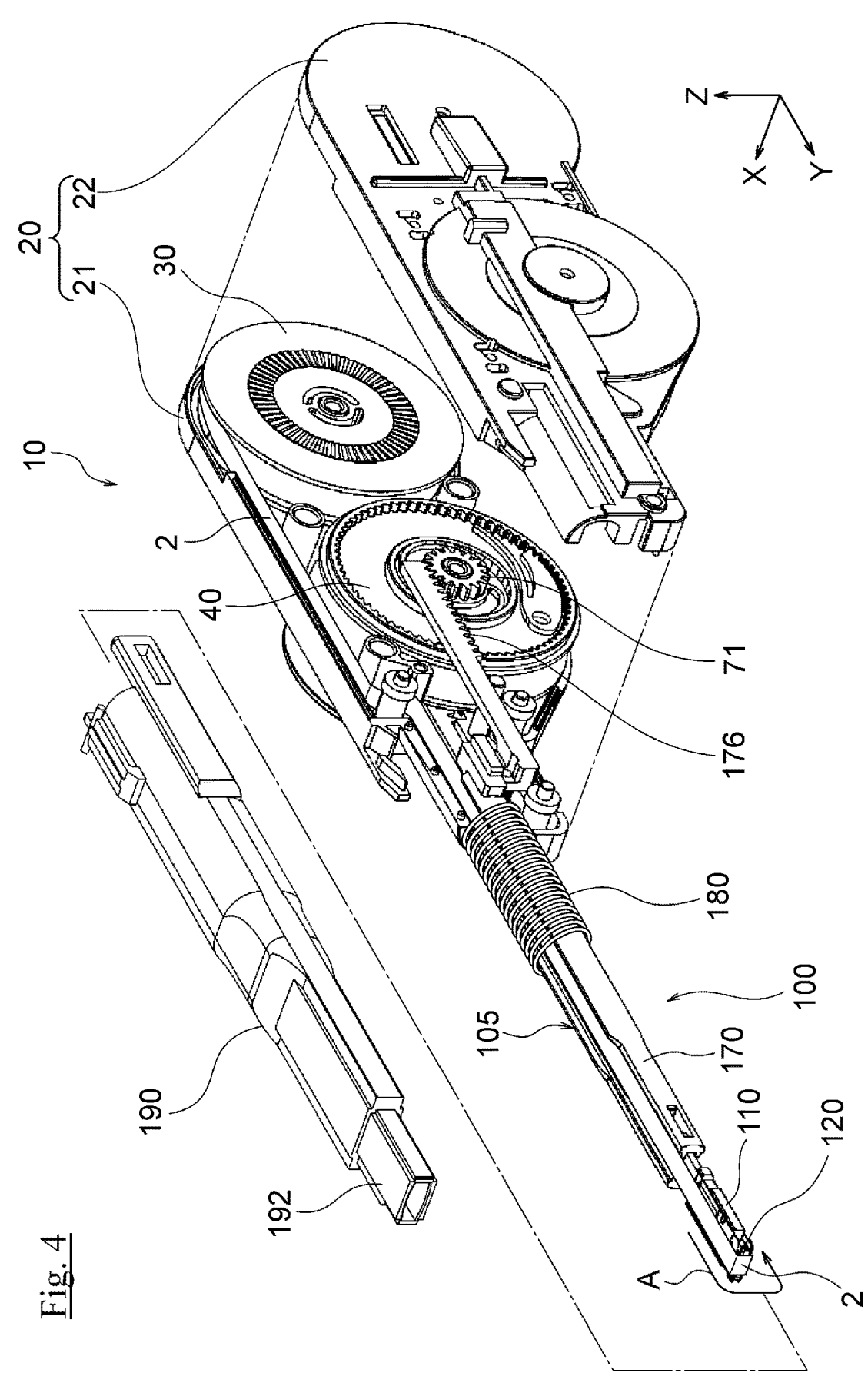
FIG. 4 is an exploded perspective view showing the optical connector cleaning tool in a state where one housing is removed from the tool main body and the tubular member is removed from the extension member in one or more embodiments.

Next, the configuration of the tool main body 10 of the cleaning tool 1 one or more embodiments will be described in detail with reference to FIG. 4 and FIG. 5. FIG. 4 is an exploded perspective view showing the optical connector cleaning tool 1 in a state where one housing 22 is removed from the tool main body 10 and the tubular member 190 is removed from the extension member 100 in one or more embodiments, and FIG. 5 is an exploded perspective view of the tool main body 10 in one or more embodiments.

Figure 5:
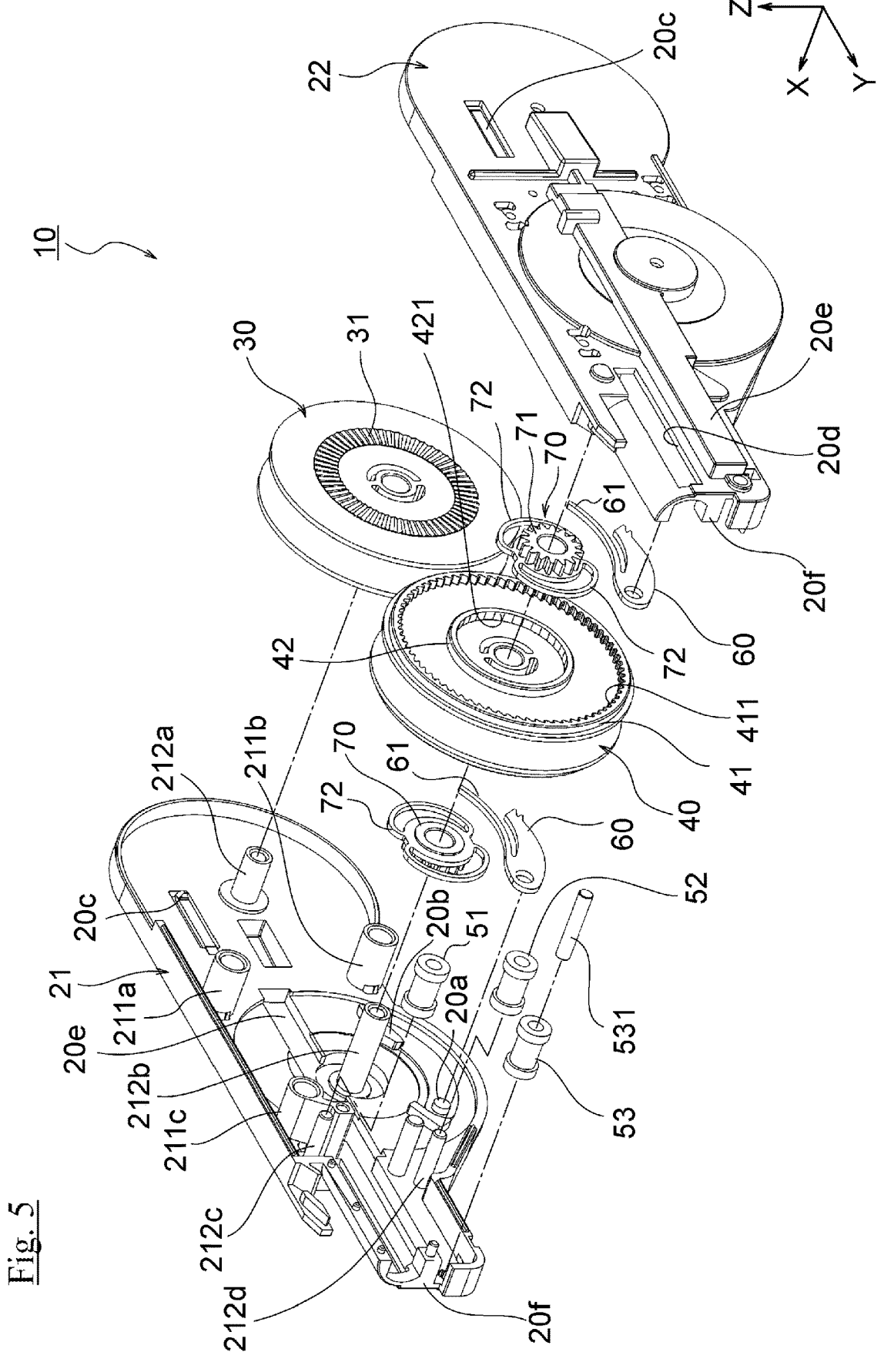
FIG. 5 is an exploded perspective view of the tool main body in one or more embodiments.

As shown in FIG. 4 and FIG. 5, the tool main body 10 includes the housing 20, the feeding bobbin 30, the winding bobbin 40, the guide cylinders 51 and 52, the roll 53, the ratchet pawls 60, and the transmission members 70.

The housing 20 includes the first housing 21 and the second housing 22. The feeding bobbin 30, the winding bobbin 40, the guide cylinders 51 and 52, the roll 53, the ratchet pawls 60, and the transmission members 70 are accommodated in the housing 20. The first housing 21 and the second housing 22 are fixed by fitting the fixing pin (not shown) formed in the second housing 22 to the fixing cylinders 211a to 211c formed in the first housing 21.

Although not particularly limited, the first and second housings 21 and 22 are made of a resin material. The support part 20a, the rib 20b, the engagement pawl 20c, the window 20d, the accommodating part 20e, and the front side surface 20f are formed in each of the first and second housings 21 and 22. In addition, the support shaft parts 212a to 212d are formed in the first housing 21. The first and second housings 21 and 22 are preferably made of a transparent resin. This allows the user to check the unused amount (remaining amount) of the cleaning element 2 inside the housing.

The feeding bobbin 30 is a reel (cylindrical winding frame) for supplying the cleaning element 2. The unused cleaning element 2 is wound around the feeding bobbin 30. The feeding bobbin 30 is rotatably supported by the support shaft part 212a of the first housing 21. As the feeding bobbin 30 rotates in accordance with the backward movement of the tool main body 10 as described above with respect to the extension member 100, the unused cleaning element 2 is continuously fed from the feeding bobbin 30 to the pressing surface 121.

The engagement grooves 31 arranged circumferentially are formed on both side surfaces of the feeding bobbin 30. On the other hand, the above-described engagement pawls 20c protrude inward from the first and second housings 21 and 22 so as to face the engagement groove 31. The idling rotation of the feeding bobbin 30 is suppressed by abutting the tip of the engagement claw 20c against the engagement groove 31.

The winding bobbin 40 is a reel for taking up the used cleaning element 2. The winding bobbin 40 is rotatably supported by the support shaft part 212b of the first housing 21. As the winding bobbin 40 rotates in accordance with the backward movement described above of the tool main body 10 with respect to the extension member 100, the used cleaning element 2 used on the pressing surface 121 is continuously wound on the winding bobbin 40.

The outer ring portion 41 and the inner ring portion 42 are formed on both side surfaces of the winding bobbin 40. The outer ring portion 41 and the inner ring portion 42 have an annular shape protruding laterally (in the X direction in the drawing) from the side surface of the winding bobbin 40 and are concentrically disposed around the axial hole of the winding bobbin 40. The ratchet gear 411 engaged with the ratchet pawl 60 is formed on the inner peripheral surface of the outer ring portion 41. On the other hand, the inner peripheral surface of the inner ring portion 42 functions as a friction surface 421 with which the leaf spring portion 72 of the transmission member 70 contacts.

The ratchet pawls 60 are disposed on both side surfaces of the winding bobbin 40 so as to be interposed between the outer ring portion 41 and the inner ring portion 42 and are rotatably supported by the support portions 20a of the housings 21 and 22. The ratchet pawl 60 constitutes a ratchet mechanism together with the ratchet gear 411 of the outer ring portion 41. The ratchet mechanism allows the winding bobbin 40 to rotate in a direction (winding direction) in which the cleaning element 2 is wound but prohibits the winding bobbin 40 from rotating in a direction opposite to the winding direction.

Specifically, when the winding bobbin 40 rotates in a direction (clockwise direction in FIG. 5) opposite to the winding direction, the rotation of the winding bobbin 40 is prohibited by the engagement of the ratchet pawl 60 with the ratchet gear 411. On the other hand, when the winding bobbin 40 rotates in the winding direction (counterclockwise direction in FIG. 5), the end of the spring portion 61 of the ratchet pawl 60 abuts against the rib 20b of each of the housings 21 and 22, and the spring portion 61 is deformed, therefore the engagement between the ratchet pawl 60 and the ratchet gear 411 is intermittently released, and the winding bobbin 40 is allowed to rotate.

The transmission members 70 are disposed inside both of the inner ring portions 42 of the winding bobbin 40. Each of the transmission members 70 is rotatably supported by the support shaft part 212b of the first housing 21 and is rotatable relative to the winding bobbin 40. That is, the support shaft part 212b of the first housing 21 supports the two transmission members 70 in addition to the winding bobbin 40.

Each of the transmission members 70 includes a pinion gear 71 and a pair of leaf spring portions 72. The pinion gear 71 protrudes laterally (in the X-axis direction in the drawing) than the outer ring portion 41 and the inner ring portion 42 of the winding bobbin 40. The pinion gear 71 is engaged with the rack gear 176 (described later) of the extension member 100, and the pinion gear 71 and the rack gear 176 constitute a rack and pinion mechanism. This rack and pinion mechanism converts the relative linear motion of the extension member 100 with respect to the tool main body 10 described above into a rotational motion.

The pair of leaf spring portions 72 are disposed to be rotationally symmetrical around the axis of the transmission member 70. The transmission member 70 is fitted inside the inner ring portion 42 of the winding bobbin 40 in a state in which the central portion of each of the plate spring portions 72 is elastically deformed inward. Therefore, a frictional force acts between each the leaf spring portions 72 and the friction surface 421 of the inner ring portion 42, and the leaf spring portion 72 and the friction surface 421 constitute a friction transmission mechanism. The rotational motion converted by the rack and pinion mechanism is transmitted to the winding bobbin 40 via the friction transmission mechanism.

The guide cylinders 51 and 52 are rotatably supported by the support shaft parts 212*c* and 212*d* of the first housing. The roll 53 is rotatably supported by the pin 531 held by the first and second housings 21 and 22. The unused cleaning element 2 fed from the feeding bobbin 30 is guided toward the pressing surface 121 of the extension member 100 by the guide cylinder 51. On the other hand, the used cleaning element 2 is guided toward the winding bobbin 40 by the guide cylinder 52 and the roll 53. At this time, the cleaning element 2 is turned back by the roll 53, and the cleaning element 2 is hooked on the roll 53.

Next, the configuration of the extension member 100 of the cleaning tool 1 one or more embodiments will be described in detail with reference to FIG. 6 to FIG. 9.

Figure 6:
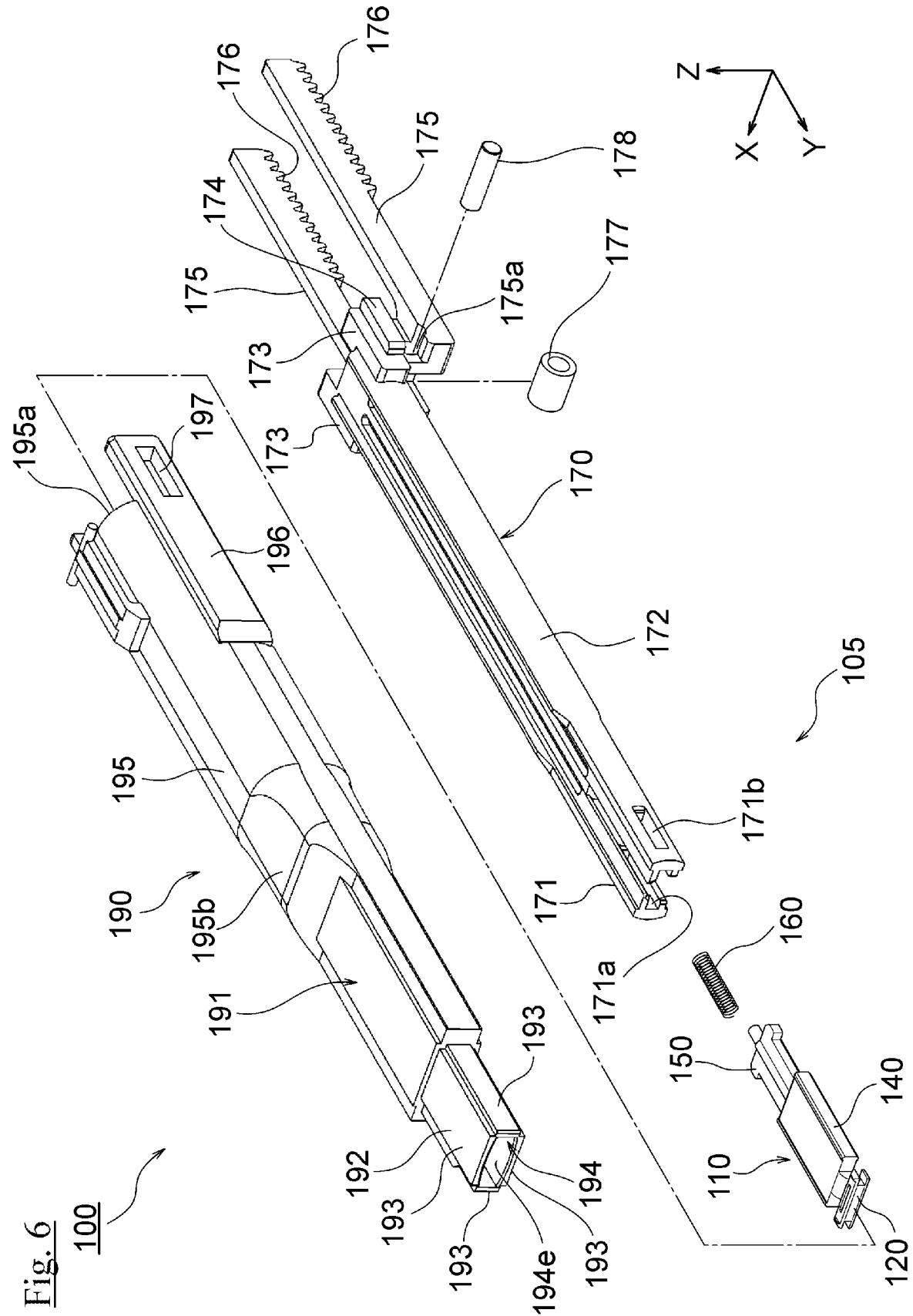
FIG. 6 is an exploded perspective view of the extension member in one or more embodiments.
Figure 7:
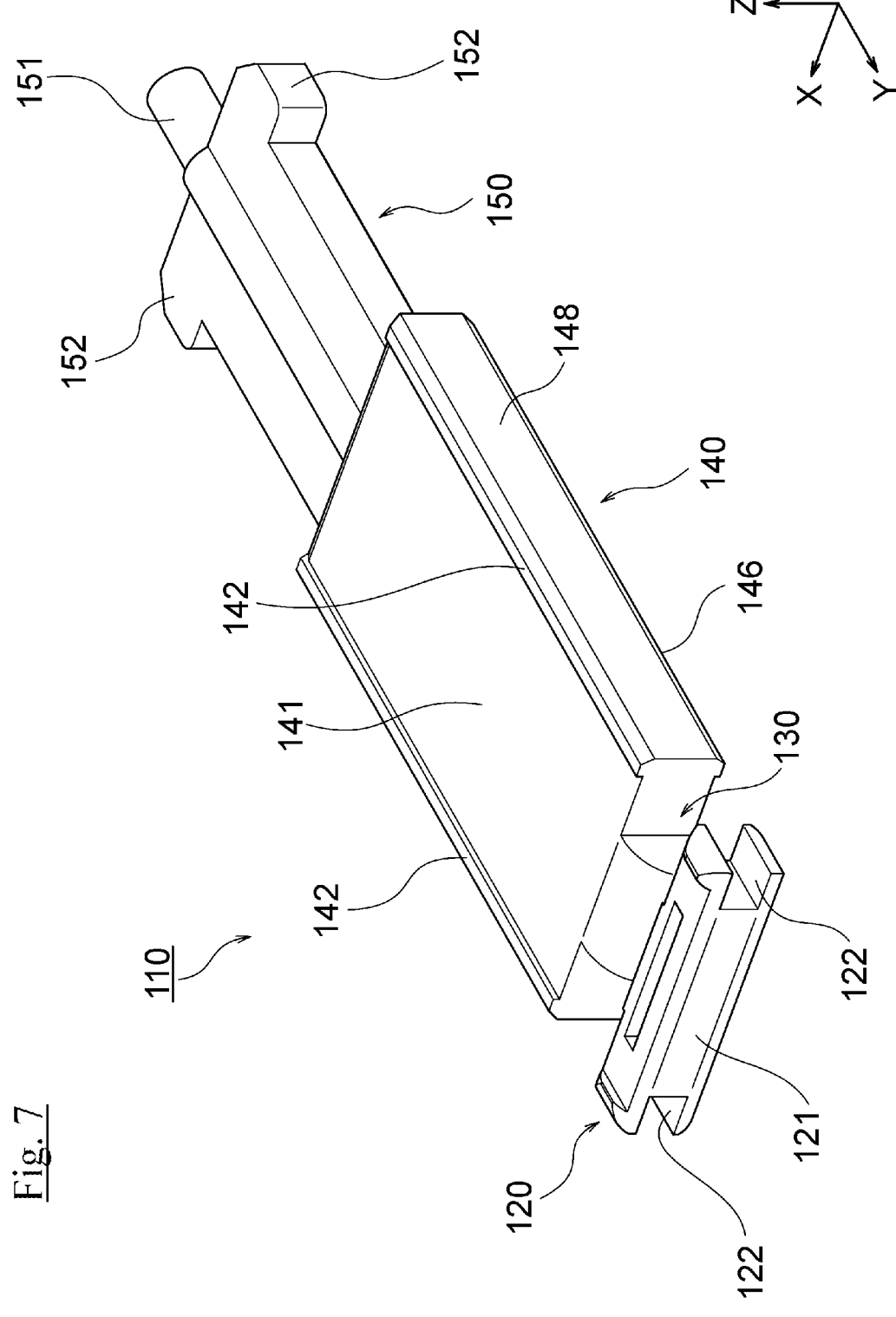
FIG. 7 is a perspective view showing the head member in one or more embodiments.
Figure 8:
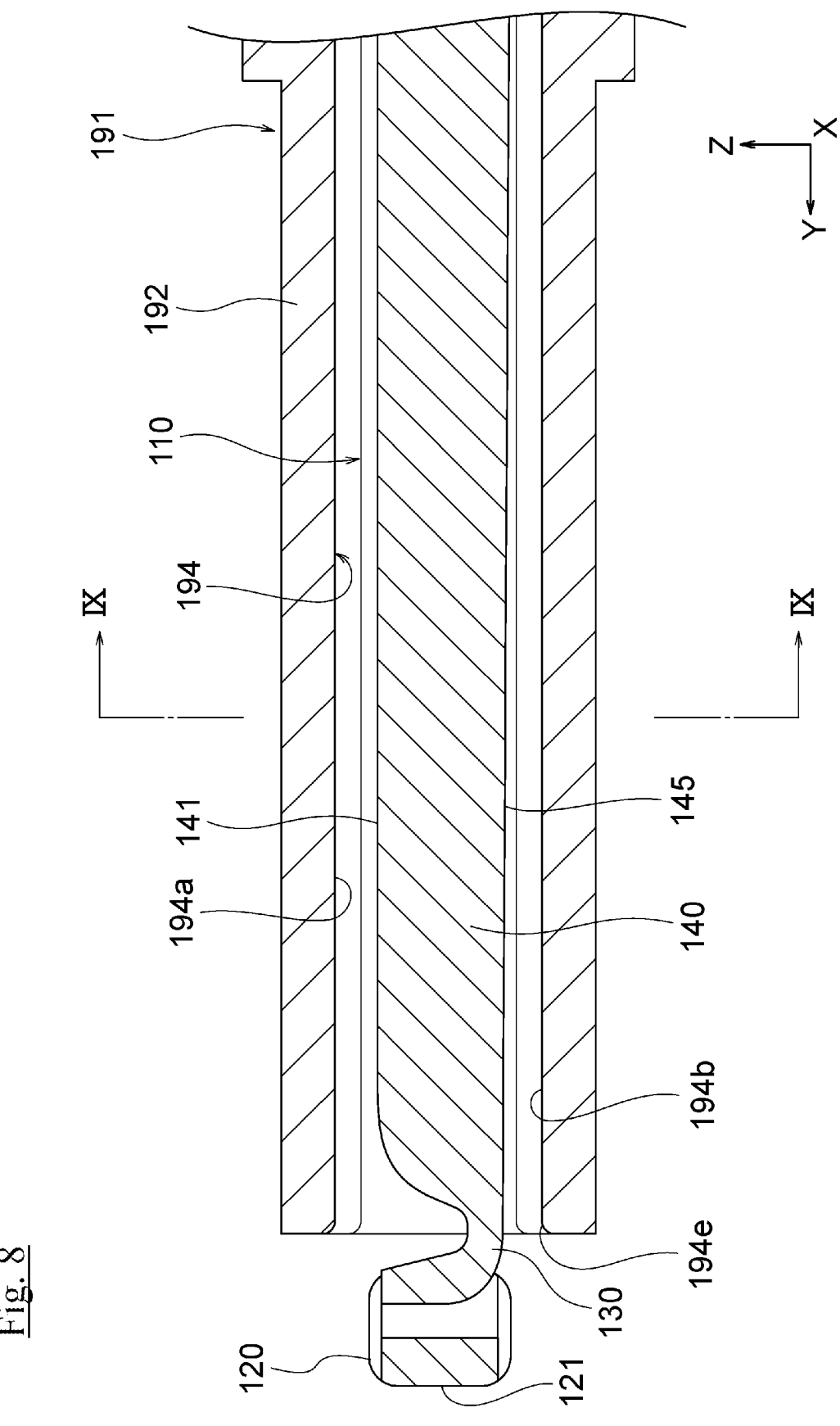
FIG. 8 is a cross-sectional view of the front end portion of the extension member in one or more embodiments and is a cross-sectional view taken along line VIII-VIII of FIG. 3.
Figure 9:
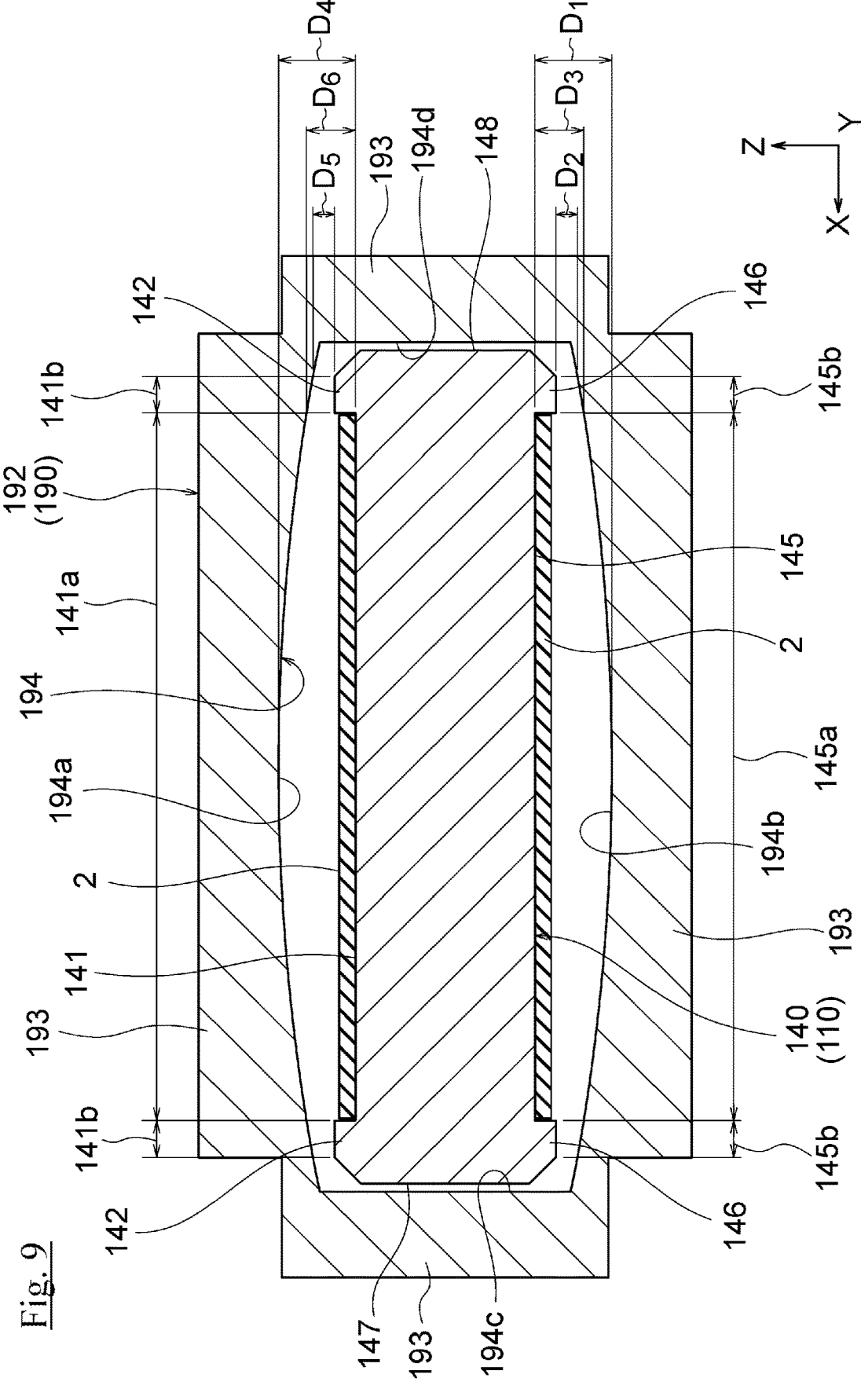
FIG. 9 is a view showing a relationship between the head member and the inner surface of the inner hole of the tubular member in one or more embodiments and is an end view taken along line IX-IX of FIG. 8.

FIG. 6 is an exploded perspective view of the extension member 100 in one or more embodiments, and FIG. 7 is a perspective view showing the head member 110 in one or more embodiments. FIG. 8 is a cross-sectional view of the front end portion of the extension member 100 in one or more embodiments and is a cross-sectional view taken along line VIII-VIII of FIG. 3. FIG. 9 is a view showing a relationship between the head member 110 and the inner surface of the inner hole 194 of the tubular member 190 in one or more embodiments and is an end view taken along line IX-IX of FIG. 8. The cleaning element 2 is not shown in FIG. 6 to FIG. 8.

As shown in FIG. 6, the extension member 100 includes the cleaning shaft 105, the coil spring 180 (see FIG. 4) for a tubular member, and a tubular member 190.

The cleaning shaft 105 is a member (pressing member) for pressing the cleaning element 2 against the connection end face of the optical connector 200. The cleaning shaft 105 is an elongate member extending along the longitudinal axis direction (the Y-axis direction in the drawing) of the extension member 100 and includes the head member (head part) 110, the coil spring 160 for the head, and the support member (support part) 170. The head member 110 and the support member 170 may be integrally molded. Further, the molded body may have a function of the coil spring 160 for the head.

The head member 110 is a member that forming the front end portion of the cleaning shaft 105. As shown in FIG. 7, the head member 110 includes the pressing part 120, the neck part 130, the main body part 140, and the insertion part 150. Although not particularly limited, for example, the head member 110 is made of a resin material, and the pressing part 120, the neck part 130, the main body part 140, and the insertion part 150 are integrally formed.

The pressing part 120 has a pressing surface 121 at its front end for pressing the cleaning element 2 against the connection end surface of the optical connector 200. The pressing surface 121 has a flat shape (rectangular shape) so as to correspond to the shape of the end surface of the ferrule 210 of the optical connector 200 to be cleaned. The cleaning element 2 is wrapped around the pressing surface 121 from the upper side to the lower side of the pressing surface 121, the unused cleaning element 2 is supplied from the upper side, and the used cleaning element 2 is sent out to the lower side (see the arrow A in FIG. 4 and FIG. 11A). That is, the cleaning element 2 moves on the pressing surface 121 from the upper side to the lower side along the short axis direction of the pressing surface 121.

A pair of insertion grooves 122 are formed at both ends of the pressing surface 121. When the pressing surface 121 is pressed against the end surface of the ferrule 210, the guide pin 211 protruding from the end surface is inserted into the insertion groove 122, therefore the pressing surface 121 can bring the cleaning element 2 into close contact with the end surface of the ferrule 210.

The pressing part 120 is connected to the main body part 140 via the neck part 130. The neck part 130 is elastically deformable with respect to a pressing force from the optical connector 200 to the pressing part 120. The neck part 130 tilts the pressing part 120 in accordance with the slope of the end face of the ferrule 210 of the optical connector 200.

The main body part 140 has a plate-like shape with a flat (rectangular) cross-sectional shape corresponding to the cross-sectional shape of the pressing part 120. The unused cleaning element 2 supplied from the upper side to the pressing surface 121 of the pressing part 120 passes over the upper surface 141 of the main body part 140. On the other hand, the used cleaning body 2 sent out to the lower side from the pressing surface 121 passes over the lower surface 145 of the main body part 140.

The ribs 142 are disposed at both ends of the upper surface 141 of the main body part 140, and the cleaning element 2 moving on the upper surface 141 is guided by the ribs 142. The ribs 146 are also disposed at both ends of the lower surface 145, and the cleaning element 2 moving on the lower surface 145 is guided by the ribs 146. The upper surface 141 of the main body part 140 may not include the ribs 142. Similarly, the lower surface 145 of the main body part 140 may not include the ribs 142.

The insertion part 150 is connected to the rear side of the main body part 140. The insertion part 150 is a part inserted into the front end part 171 of the support member 170 and has a plate-like shape having a width narrower than that of the main body part 140. The columnar shaft part 151 protruding rearward (in −Y direction in the drawing) and the protrusions 152 protruding laterally (in the X-axis direction in the drawing) are formed at a rear end of the insertion part 150.

As shown in FIG. 6, the coil spring 160 for the head is interposed between the head member 110 and the support member 170 in a state in which the shaft part 151 of the head member 110 is inserted into the coil spring 160 for the head. The head member 110 is biased forward with respect to the support member 170 by the coil spring 160 for the head. Therefore, the pressing surface 121 of the head member 110 can press the cleaning element 2 against the connection end surface of the optical connector 200 with an appropriate pressing force.

The support member 170 is a member that movably supports the head member 110 in the front-rear direction (the Y-axis direction in the drawing). As shown in FIG. 6, the support member 170 includes the front end part 171, the body part 172, the shoulder parts 173, and the arm parts 175. Although not particularly limited, for example, the support member 170 is made of a resin material, and the front end part 171, the body part 172, the shoulder parts 173, and the arm parts 175 are integrally formed.

The insertion grooves 171a and the windows 171b are formed in the front end part 171 of the support member 170. The insertion grooves 171a are grooves opened at the front end of the support member 170. The insertion part 150 of the head member 110 is movably inserted into the insertion grooves 171a in the front-rear direction (the Y-axis direction in the drawing). Further, the windows 171b are open on the side surface of the front end part 171. The protrusions 152 of the insertion part 150 of the head member 110 are inserted into the windows 171b. The head member 110 is guided in the front-rear direction by the insertion grooves 171a, and the head member 110 biased by the coil spring 160 for the head is prevented from falling out forward (in the +Y direction in the drawing) by the windows 171b.

The body part 172 is connected to the rear side of the front end part 171. The body part 172 has a columnar shape and is an elongate portion extending along the axial direction (the Y-axis direction in the drawing) of the extension member 100. Although the rear portion of the body part 172 is disposed within the housing 20 of the tool main body 10, the other portion of the body part 172 extends forward (in the +Y direction in the drawing) from the front side surface 20f of the housing 20.

The upper surface of the body part 172 functions as a guide surface for guiding the unused cleaning element 2 supplied from the tool main body 10 to the head member 110. On the other hand, the lower surface of the body part 172 functions as a guide surface for guiding the used cleaning body 2 collected from the head member 110 to the roll 177. The body part 172 is inserted into the coil spring 180 for the tubular member and also has a function of supporting the coil spring 180 for the tubular member (see FIG. 4).

The pair of shoulder parts 173 are connected to the rear end of the body part 172. The shoulder parts 173 protrude laterally (in the X-axis direction in the drawing) from the rear end of the body part 172 and are disposed in the windows 20d of the first and second housings 21 and 22.

Further, the protrusions 174 protruding laterally (in the X-axis direction in the drawing) are formed in the shoulder parts 173. In a state where the shoulder parts 173 are disposed in the windows 20d of the housings 21 and 22, the protrusions 174 protrude from the windows 20d and are fitted into the windows 197 (described later) of the tubular member 190 (refer to FIG. 3).

The pair of arm parts 175 are connected to the lower side of the shoulder parts 173 and extend rearward (the −Y direction in the drawing) from the shoulder parts 173. The arm parts 175 are respectively accommodated in the accommodating parts 20e of the first and second housings 21 and 22.

The holding holes 175a are formed in the front end portions of the pair of arm parts 175. The pin 178 is inserted into the holding holes 175a, and a roll 177 is rotatably supported by the pin 178. The used cleaning element 2 guided along the lower surface of the body part 172 is guided toward the winding bobbin 40 by the roll 177 and the guide cylinder 52 and the roll 53 of the tool main body 10 described above. At this time, the cleaning element 2 is turned back by the roll 177, and the cleaning element 2 is hooked on the roll 177. As described above, since the cleaning element 2 is also turned back by the roll 53 of the tool main body 10, as a result, the cleaning element 2 is stretched between the rolls 177 and 53.

Further, the rack gear 176 is formed at a rear portion of each of the arm parts 175. The winding bobbin 40 is disposed between the pair of rack gears 176, and the rack and pinion mechanism is configured by engaging the above-described pinion gear 71 of the transmission member 70 with the rack gear 176.

The tubular member 190 is a member having the tubular part 191 and the plate parts 196. The tubular part 191 includes the front end part 192 that is inserted into the adapter 240 when the optical connector 200 is cleaned and the main body part 195 that is connected to the rear side of the front end part 192. The convex portions 193 are formed on the upper, lower, left, and right outer surfaces of the front end part 192. When the front end part 192 is inserted into the adapter 240, the convex portions 193 are fitted into the grooves 242 formed in the insertion port 241 of the adapter 240.

The tubular part 191 includes the inner hole penetrating in the axial direction (the Y-axis direction in the drawing), and the cleaning shaft 105 and the coil spring 180 for the tubular member are accommodated in the inner hole. The tubular part 191 also has a function of protecting the cleaning element 2 that moves along the upper and lower surfaces of the body part 172 of the support member 170. Although not particularly limited, for example, the tubular member 190 is made of a resin material, and the front end part 192, the main body part 195, and the plate parts 196 are integrally formed.

As shown in FIG. 8, the main body part 140 of the head member 110 is accommodated in the inner hole 194 of the front end part 192 of the tubular part 191. The pressing part 120 of the head member 110 connected to the main body part 140 via the neck part 130 protrudes forward (in the +Y direction in the drawing) from the opening 194e of the inner hole 194 of the front end part 192 of the tubular part 191.

In one or more embodiments, the inner hole 194 of the front end part 192 of the tubular part 191 has a cross-sectional shape as shown in FIG. 9. That is, the inner hole 194 has a flat cross-sectional shape capable of accommodating the main body part 140 of the head member 110 and includes the inner surface including the upper surface 194a, the lower surface 194b, and the side surfaces 194c and 194d.

The upper surface 194a of the inner hole 194 has an arc-shaped cross section recessed upward so as to widen the space of the inner hole 194. The upper surface 194a faces the upper surface 141 (second facing portion) of the main body part 140 of the head member 110. The unused cleaning element 2 supplied from the upper side to the pressing surface 121 of the head member 110 passes between the upper surface 194a and the upper surface 141 of the main body part 140.

Similarly, the lower surface 194b of the inner hole 194 has an arc-shaped cross-section recessed downward so as to widen the space of the inner hole 194. The lower surface 194b faces the lower surface 145 (first facing portion) of the main body part 140 of the head member 110. The used cleaning element 2 sent out to the lower side from the pressing surface 121 of the head member 110 passes between the lower surface 194b and the lower surface 145 of the main body part 140.

On the other hand, one side surface 194c of the inner hole 194 has a cross-sectional shape that straightly connects one end of the upper surface 194a and one end of the lower surface 194b. The side surface 194c faces the side surface 147 of the main body part 140 of the head member 110, but the cleaning element 2 is not interposed between the side surfaces 194c and 147.

Similarly, the other side surface 194d of the inner hole 194 also has a cross-sectional shape that straightly connects the other end of the upper surface 194a and the other end of the lower surface 194b. The side surface 194d faces the side surface 148 of the main body part 140 of the head member 110, but the cleaning element 2 is not interposed between the side surfaces 194d and 148.

In one or more embodiments, as shown in FIG. 9, since the lower surface 194b of the inner hole 194 has an arc-shaped cross-sectional shape recessed downward so as to widen the space of the inner hole 194 as described above, the first gap D1 is larger than the second gap D2.

Here, the first gap D1 is a gap between the widthwise central portion of the first region 145a of the lower surface 145 of the head member 110 and the lower surface 194b of the inner hole 194. The second gap D2 is a gap between the second region 145b of the lower surface 145 of the head member 110 and the lower surface 194b of the inner hole 194.

The first region 145a is a portion of the lower surface 145 of the main body part 140 of the head member 110 where the cleaning element 2 is interposed between the lower surface 145 and 194b. On the other hand, the second region 145b is a portion adjacent to the first region 145a in the lower surface 145 of the main body part 140 of the head member 110 and is a portion where the cleaning element 2 is not interposed between the lower surfaces 145 and 194b.

Further, in one or more embodiments, as shown in FIG. 9, since the lower surface 194b of the inner hole 194 has an arc-shaped cross-sectional shape recessed downward so as to widen the space of the inner hole 194 as described above, the first gap D1 is larger than the third gap D3. Here, the third gap D3 is a gap between the end of the first region 145a in the widthwise direction (the X-axis direction in the drawing) and the lower surface 194b of the inner hole 194.

Similarly, in one or more embodiments, as shown in FIG. 9, since the upper surface 194a of the inner hole 194 has an arc-shaped cross-sectional shape that is recessed upward so as to widen the space of the inner hole 194 as described above, the fourth gap D4 is larger than the fifth gap D5.

Here, the fourth gap D4 is a gap between the widthwise central portion of the third region 141a of the upper surface 141 of the head member 110 and the upper surface 194a of the inner hole 194. The fifth gap D5 is a gap between the fourth region 141b of the upper surface 141 of the head member 110 and the upper surface 194a of the inner hole 194.

The third region 141a is a portion of the upper surface 141 of the main body part 140 of the head member 110 where the cleaning element 2 is interposed between the upper surfaces 141 and 194a. On the other hand, the fourth region 141b is a portion adjacent to the third region 141a in the upper surface 141 of the main body part 140 of the head member 110 and is a portion where the cleaning element 2 is not interposed between the upper surfaces 141 and 194a.

Further, in one or more embodiments, as shown in FIG. 9, since the upper surface 194a of the inner hole 194 has an arc-shaped cross-sectional shape recessed upward so as to widen the space of the inner hole 194 as described above, the fourth gap D4 is larger than the sixth gap D6. Here, the sixth gap D6 is a gap between the end of the third region 141a in the widthwise direction (the X-axis direction in the drawing) and the upper surface 194a of the inner hole 194.

The cross-sectional shape of the inner hole 194 of the front end part 192 of the tubular member 190 is not particularly limited as long as the first gap D1 is larger than the second gap D2 and the fourth gap D4 is larger than the fifth gap D5.

Figure 10:
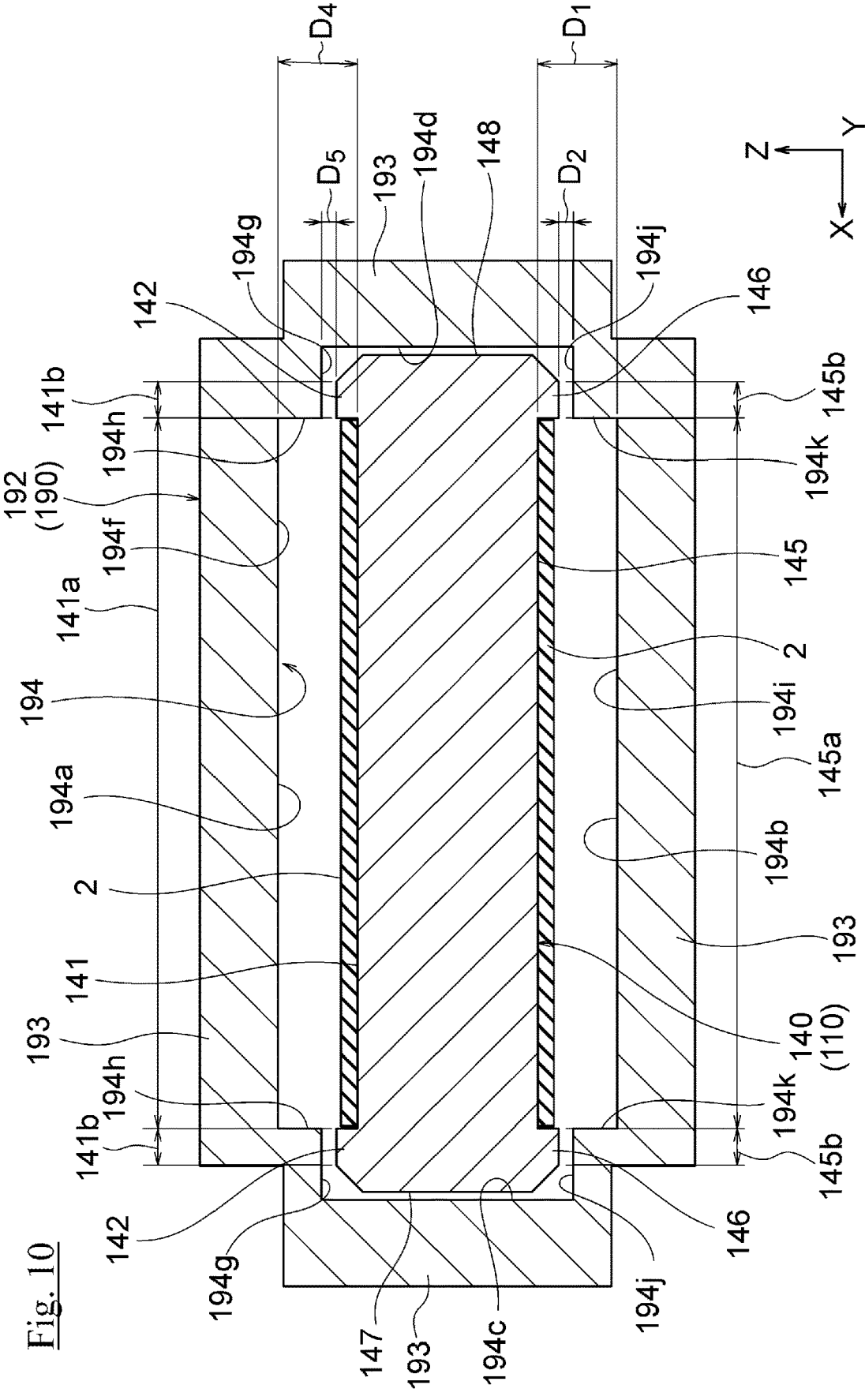
FIG. 10 is an end view showing a modification of the inner hole of the tubular member in one or more of embodiments.

For example, as shown in FIG. 10, the lower surface 194b of the inner hole 194 may have a stepped cross-sectional shape that is recessed downward. Similarly, the upper surface 194a of the inner hole 194 may have a stepped cross-sectional shape that is recessed upward. FIG. 10 is an end view showing a modification of the inner hole 194 of the tubular member 190 in one or more embodiments.

Although not particularly illustrated, in this case, the bottom surface of the recess of the lower surface 194b of the inner hole 194 may have an arc shape recessed downward. Similarly, the bottom surface of the recess of the upper surface 194a of the inner hole 194 may have an arc shape recessed upward.

Alternatively, although not particularly illustrated, the shape of the lower surface 194b of the inner hole 194 may have a stepped shape such that the step portion 194k between the lower step 194i and the upper step 194j faces the end of the first region 145a in the width direction (the X-axis direction in the drawing), and the first gap D1 is larger than the third gap D3 in this case. Further, the shape of the upper surface 194a of the inner hole 194 may have a stepped shape such that the step portion 194h between the lower step 194f and the upper step 194g faces the end of the third region 141a in the width direction of the third region 141a (the X-axis direction in the drawing), the fourth gap D4 is larger than the sixth gap D6 in this case. Also in this case, the bottom surface of the recess of the lower surface 194b of the inner hole 194 may have an arc shape that is recessed downward. Similarly, the bottom surface of the recess of the upper surface 194a of the inner hole 194 may have an arc shape that is recessed upward.

Further, although the step shape of the lower surface 194b of the inner hole 194 is two steps in one or more embodiments, the step shape of the lower surface is not particularly limited to this, and the lower surface 194b may have a step shape of three or more steps. Similarly, the step shape of the upper surface 194a of the inner hole 194 is two steps in one or more embodiments, the step shape of the upper surface is not particularly limited to this, and the upper surface 194a may have a step shape of three or more steps.

Returning to FIG. 6, the shoulder parts 173 and the arm parts 175 of the support member 170 protrude rearward (toward the −Y direction in the drawing) from the rear opening 195a of the main body part 195 of the tubular part 191 of the tubular member 190. Then, the protrusions 174 of the shoulder parts 173 of the support member 170 are fitted into the windows 197 formed in the plate parts 196 of the tubular member 190 (refer to FIG. 3), therefore the support member 170 and the tubular member 190 are fixed to each other.

Further, the main body part 195 of the tubular part 191 of the tubular member 190 has a tapered portion 195b having a larger inner diameter at a central portion thereof. The coil spring 180 for the tubular member is interposed between the tapered portion 195b and the front side surface 20f of the housing 20. The coil spring 180 for the tubular member biases the tubular member 190 in a direction away from the tool main body 10 (the +Y direction in the drawing).

Next, an example of the method of using the optical connector cleaning tool 1 described above will be described with reference to FIG. 11A and FIG. 11B.

Figure 11A:
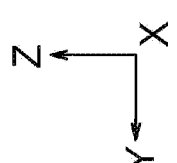
FIG. 11A is a side view showing the state of use of the optical connector cleaning tool in one or more embodiments showing a state where the tool main body is moved toward the extension member.
Figure 11A:
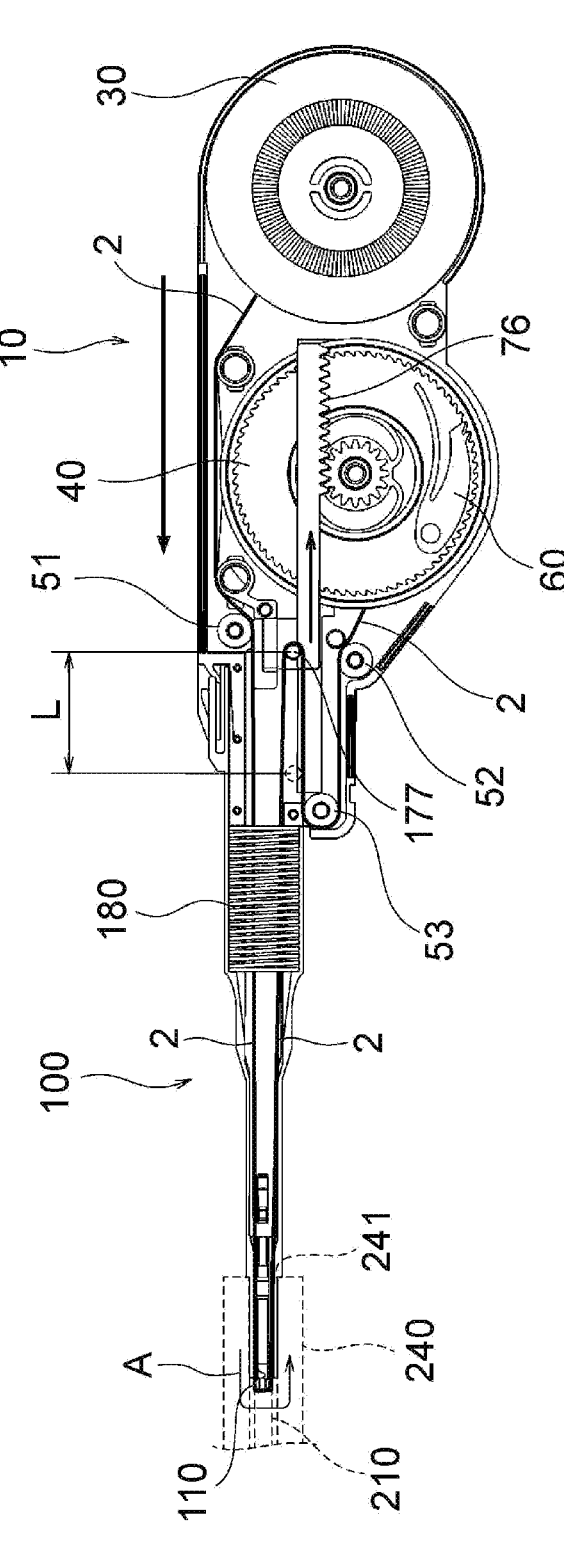
Figure 11B:
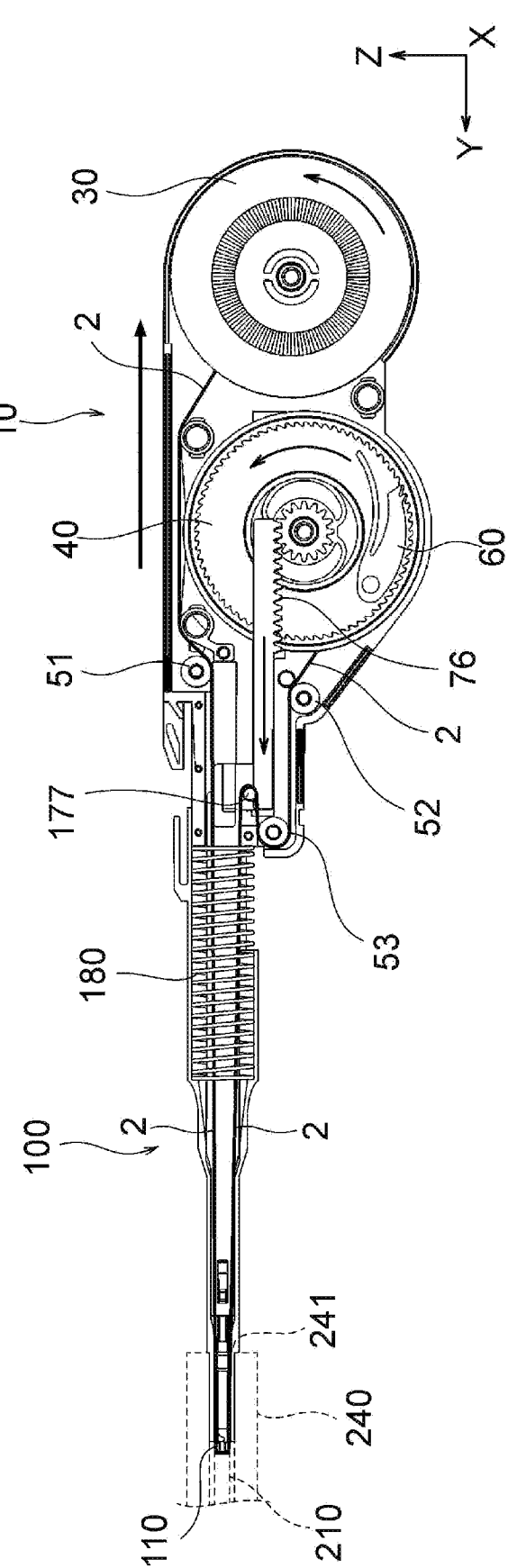
FIG. 11B is a side view showing the state of use of the optical connector cleaning tool in one or more embodiments and showing a state where the tool main body is moved backward from the extension member.

FIG. 11A and FIG. 11B, are side views showing the state of use of the optical connector cleaning tool 1 in one or more embodiments, FIG. 11A is a view showing a state where the tool main body 10 is moved toward the extension member 100, and FIG. 11B is a view showing a state where the tool main body 10 is moved backward from the extension member 100.

When the connection end face of the optical connector 200 is cleaned using the optical connector cleaning tool 1, the operator first inserts the front end portion of the extension member 100 of the cleaning tool 1 into the insertion port 241 of the adapter 240. As a result, the pressing surface 121 of the head member 110 presses the cleaning element 2 against the end surface of the ferrule 210. At this time, the convex portions 193 of the front end part 192 of the tubular member 190 of the extension member 100 are fitted into the grooves 242 of the adapter 240, therefore the pressing surface 121 of the head member 110 is positioned with respect to the ferrule 210 of the optical connector 200.

Next, when the operator pushes the tool main body 10 with respect to the extension member 100, as shown in FIG. 11A, the coil spring 180 for the tubular member is compressed, and the distance between the roll 177 of the extension member 100 and the roll 53 of the tool main body 10 increases by a predetermined length L.

Therefore, the length of the cleaning element 2 existing between the supply-side guide cylinder 51 and the roll 177 is shortened by the predetermined length L, while the length of the cleaning element 2 existing between the rolls 177 and 53 is lengthened by the predetermined length L. As a result, the cleaning element 2 on the pressing surface 121 is pulled toward the winding bobbin 40 side and the cleaning element 2 slides while being pressed against the end surface of the ferrule 210 to wipe off the dirt adhering to the end surface.

At this time, in one or more embodiments, as described above, the first gap D1 is wider than the second gap D2. That is, in one or more embodiments, a wide clearance is ensured between the cleaning element 2 passing over the lower surface 145 of the head member 110 and the central portion of the lower surface 194b of the inner hole 194 of the tubular member 190. Therefore, even if the long cleaning shaft 105 is bent downward (toward the winding bobbin 40 side) by pulling the cleaning element 2 toward the winding bobbin 40 side, the contact area between the cleaning element 2 and the lower surface 194b of the inner hole 194 of the tubular member 190 can be reduced. Therefore, it is possible to reduce the frictional force generated in the cleaning element 2, and it is possible to suppress occurrence of a situation (so-called jamming) in which the cleaning element 2 is stuck between the head member 110 of the cleaning shaft 105 and the tubular member 190.

In particular, when the optical connector is miniaturized and the short-axis direction of the end face shape of the ferrule is shortened, the thickness of the cleaning shaft of the cleaning tool is also reduced, and the cleaning shaft is easily bent, therefore the occurrence of the above-described jamming may become remarkable. In contrast, in one or more embodiments, since the first gap D1 is wide, even when the cleaning shaft 105 is thinned in accordance with the miniaturization of the optical connector 200, it is possible to effectively suppress the occurrence of the jamming.

Further, when the cleaning tool is miniaturized as the miniaturization of the optical connector, the clearance between the lower surface of the head member and the lower surface of the inner hole of the tubular member tends to become smaller, and the occurrence of the above-described jamming may also become remarkable in this case. In contrast, in one or more embodiments, since the first gap D1 is wide, even when the cleaning tool 1 is miniaturized, it is possible to reduce the contact area between the cleaning element 2 and the lower surface 194b of the inner hole 194 of the tubular member 190, and it is possible to effectively suppress the occurrence of the jamming.

Further, when the pressing part of the head member is pressed and the coil spring 160 for the head is compressed, an excess length may be generated in the cleaning element 2. In contrast, in one or more embodiments, since the first gap D1 is wide, when the pressing part 120 of the head member 110 is pressed and the coil spring 160 for the head is compressed, the flexible cleaning element 2 can be deformed and pass through the first gap D1. Therefore, it is possible to prevent the end portion of the cleaning element 2 in the width direction (the X-axis direction in the drawing) from being stuck between the lower surface 145 of the head member 110 and the inner hole 194 of the tubular member 190.

On the other hand, in one or more embodiments, the second gap D2 is narrower than the first gap D1. That is, the clearance between the cleaning element 2 passing over the lower surface 145 of the head member 110 and both end portions of the lower surface 194b of the inner hole 194 of the tubular member 190 is narrower than the above-described clearance at the central portion. Here, the corner portion of the front end portion of the tubular member tends to be thinned in order to correspond to the shape of the insertion port 241 of the adapter 240. In contrast, in one or more embodiments, since the second gap D2 is narrower than the first gap D1, it is possible to suppress the thinning of the corner portion of the front end part 192 of the tubular member 190.

Further, in one or more embodiments, the fourth gap D4 is larger than the fifth gap D5. That is, a wide clearance is ensured between the cleaning element 2 passing over the upper surface 141 of the head member 110 and the central portion of the upper surface 194a of the inner hole 194 of the tubular member 190. Therefore, even when the cleaning tool 1 is miniaturized as the miniaturization of the optical connector, it is possible to reduce the contact area between the cleaning element 2 and the upper surface 194a of the inner hole 194 of the tubular member 190, and it is possible to effectively suppress the occurrence of the jamming.

Since the cleaning tool 1 is intended to clean the multi-fiber collective connection type optical connector 200 having a ferrule 210 having a flat end face as described above, the cleaning shaft 105 of the cleaning tool 1 does not rotate with respect to the tool main body 10 about the axis of the cleaning shaft 105.

Further, as shown in FIG. 11A, the rack gear 176 rotates the pinion gear 71 by pushing the tool main body 10 by the operator. However, since the rotation of the winding bobbin 40 in the direction (clockwise in FIG. 11A) opposite to the winding direction (counterclockwise in FIG. 11A) is prohibited by the ratchet pawl 60, a slip occurs between the leaf spring portion 72 of the transmission member 70 and the friction surface 421 of the inner ring portion 42. Therefore, in this case, the transmission member 70 idles and the winding bobbin 40 does not rotate.

Next, when the operator releases the pushing of the tool main body 10 with respect to the extension member 100, as shown in FIG. 11B, the tool main body 10 is moved backward with respect to the extension member 100 by the elastic force of the coil spring 180 for the tubular member, the distance between the roll 177 of the extension member 100 and the roll 53 of the tool main body 10 is shortened by the predetermined length L, and the rack gear 176 rotates the pinion gear 71 at the same time. The rotational force of the pinion gear 71 is transmitted to the winding bobbin 40 via the leaf spring portion 72 of the transmission member 70 and the friction surface 421 of the inner ring portion 42, the winding bobbin 40 rotates, and the used cleaning element 2 is wound around the winding bobbin 40.

That is, the drive mechanism for rotationally driving the winding bobbin 40 in accordance with the relative movement of the extension member 100 with respect to the tool main body 10 includes the rack and pinion mechanism described above and the friction transmission mechanism described above. The rack and pinion mechanism includes the rack gear 176 and the pinion gear 71, and the friction transmission mechanism includes the leaf spring portion 72 and the friction surface 421.

At the same time, the length of the cleaning element 2 existing between the supply-side guide cylinder 51 and the roll 177 is lengthened by a predetermined length L. At this time, since the distance between the pressing surface 121 of the head member 110 and the roll 177 is constant and the cleaning element 2 is wrapped around the pressing surface 121 of the head member 110, the unused cleaning element 2 having a length corresponding to the predetermined length L is sent out from the feeding bobbin 30.

When the cleaning is finished, the operator removes the cleaning tool 1 from the adapter 240 by pulling out the extension member 100 from the insertion port 241 of the adapter 240.

As described above, in one or more embodiments, the first gap D1 between the lower surface 194*b* of the inner hole 194 of the tubular member 190 and the first region 145*a* of the lower surface 145 of the head member 110 is wider than the second gap D2 between the lower surface 194*b* of the inner hole 194 and the second region 145*b* of the lower surface 145 of the head member 110. Therefore, it is possible to suppress occurrence of a situation in which the cleaning element 2 is stuck between the head member 110 of the cleaning shaft 105 and the tubular member 190, and it is possible to smoothly collect the cleaning element 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the cross-sectional shapes of both the upper surface 194*a* and the lower surface 194*b* of the inner hole 194 of the front end part 192 of the tubular member 190 are arc shapes in the above-described embodiment-, but the cross-sectional shapes are not particularly limited thereto. Specifically, only the cross-sectional shape of the lower surface 194*b* that is the winding bobbin 40 side (collection side) may be an arc shape, and the cross-sectional shape of the upper surface 194*a* that is the feeding bobbin 30 side (supply side) may be a straight shape. That is, as long as the first gap D1 is larger than the second gap D2, the fourth gap D4 and the fifth gap D5 may be the same. Further, it is also possible to form a V-shape instead of an arc shape so as to satisfy the respective gap conditions.

Further, as disclosed in FIG. 12(*a*) to FIG. 12(*c*) of JP 2014-35489A, it is not necessary to provide the roll 153 and 177 for supplying the cleaning element 2 of a predetermined length L. In this case, the winding direction of the winding bobbin 40 is opposite to the above embodiments, and the ratchet mechanism including the ratchet pawl 60 and the ratchet gear 411 is also disposed in the opposite direction to the above embodiment-.

EXPLANATIONS OF LETTERS OR NUMERALS

1 . . . Optical connector cleaning tool
2 . . . Cleaning element
10 . . . Tool main body
20 . . . Housing
30 . . . Feeding bobbin
40 . . . Winding bobbin
100 . . . Extension member
105 . . . Cleaning shaft
110 . . . Head member
120 . . . Pressing part
121 . . . Pressing surface
140 . . . Main body part
141 . . . Upper surface
141*a* . . . Third region
141*b* . . . Fourth region
145 . . . Lower surface
145*a* . . . First region
145*b* . . . Second region
170 . . . Support member
190 . . . Tubular member
191 . . . Tubular part
192 . . . Front end part
194 . . . Inner hole
194*a* . . . Upper surface
194*b* . . . Lower surface
200 . . . Optical connector
210 . . . Ferrule

The invention claimed is:

1. An optical connector cleaning tool comprising:
a supplier that supplies a cleaning element having a belt shape;
a cleaning shaft including:
a head having a pressing surface that presses the cleaning element supplied from the supplier against a connection end surface of an optical connector; and
a supporter supporting the head;
a collector that collects the cleaning element from the pressing surface; and
a tubular member having an inner hole accommodating the cleaning shaft such that the head protrudes from the inner hole, wherein
the cleaning element collected from the pressing surface to the collector passes between an inner surface of the inner hole and a first facing portion of the head facing the inner surface,
the first facing portion includes:
a first region in which the cleaning element is interposed between the inner surface and the first facing portion; and
a second region adjacent to the first region,
in a cross section of the optical connector cleaning tool perpendicular to an axial direction of the tubular member, a gap between the inner surface and the first facing portion at the first region is wider than a gap between the inner surface and the first facing portion at the second region,
the optical connector cleaning tool cleans the connection end surface,
a portion of the inner surface facing the first facing portion has an arc cross-sectional shape recessed toward an outside of the optical connector cleaning tool, and a curvature radius of the arc cross-sectional shape is greater than a maximum width of the inner hole in a thickness direction of the head.

2. The optical connector cleaning tool according to claim 1, wherein the cleaning element supplied from the supplier to the pressing surface passes between the inner surface of the inner hole and a second facing portion of the head facing the inner surface, the second facing portion includes:

a third region in which the cleaning element is interposed between the inner surface and the second facing portion; and a fourth region adjacent to the third region, and a gap between the inner surface and the third region is wider than a gap between the inner surface and the fourth region.

3. The optical connector cleaning tool according to claim 1, wherein the supplier includes a feeding bobbin that feeds the cleaning element before use, the collector includes a winding bobbin that winds the cleaning element after use, and the optical connector cleaning tool further comprises:

a tool main body housing the feeding bobbin and the winding bobbin; and a driver that rotates the winding bobbin in accordance with a relative movement of the cleaning shaft with respect to the tool main body to wind the cleaning element around the winding bobbin.

\* \* \* \* \*